United States Patent
Satoh et al.

(10) Patent No.: US 6,793,724 B2
(45) Date of Patent: Sep. 21, 2004

(54) INK FOR INK-JET RECORDING AND COLOR INK SET

(75) Inventors: Noriaki Satoh, Nagoya (JP); Satoshi Tanabe, Nagoya (JP); Masaya Fujioka, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 106 days.

(21) Appl. No.: 10/236,717

(22) Filed: Sep. 6, 2002

(65) Prior Publication Data

US 2003/0061967 A1 Apr. 3, 2003

(30) Foreign Application Priority Data

Sep. 17, 2001 (JP) ........................................ 2001-281659

(51) Int. Cl.$^7$ .............................................. C09D 11/02

(52) U.S. Cl. ................................ 106/31.89; 106/31.75; 106/31.86

(58) Field of Search ........................... 106/31.89, 31.75, 106/31.86

(56) References Cited

U.S. PATENT DOCUMENTS

| | | | | |
|---|---|---|---|---|
| 5,019,166 A | * | 5/1991 | Schwarz | 106/31.43 |
| 5,571,311 A | | 11/1996 | Belmont et al. | |
| 5,626,655 A | * | 5/1997 | Pawlowski et al. | 106/31.27 |
| 5,863,320 A | * | 1/1999 | Breton et al. | 106/31.59 |
| 5,954,866 A | * | 9/1999 | Ohta et al. | 106/31.89 |
| 5,993,527 A | * | 11/1999 | Tochihara et al. | 106/31.85 |
| 6,312,512 B1 | * | 11/2001 | Urban et al. | 106/495 |
| 2002/0096085 A1 | * | 7/2002 | Gotoh et al. | 106/31.86 |

FOREIGN PATENT DOCUMENTS

| | | | |
|---|---|---|---|
| GB | 1072702 | * | 6/1967 |
| JP | 11-12508 | | 1/1999 |
| JP | 2001-81372 | | 3/2001 |

* cited by examiner

Primary Examiner—Helene Klemanski
(74) Attorney, Agent, or Firm—Reed Smith LLP (57) ABSTRACT

An ink for ink-jet recording comprises a pigment, an anionic surfactant, and a cationic surfactant. The cationic surfactant interacts with the anionic surfactant which does not contribute to the dispersion of the pigment in the ink to avoid any excessive permeation of the anionic surfactant into paper. It is possible to obtain a sharp image in which the printing concentration is high and the feathering and the bleeding are scarcely caused.

10 Claims, 3 Drawing Sheets

INK FOR INK-JET RECORDING AND COLOR INK SET

BACKGROUND OF THE INVENTION

1. Field of the Invention

The present invention relates to an ink for ink-jet recording and a color ink set composed of inks having a plurality of colors, and to an ink-jet recording apparatus.

2. Description of the Related Art

In the ink-jet recording method, ink droplets are formed by means of a variety of ink discharging process including, for example, the electrostatic attraction process, a process in which mechanical vibration or displacement is applied to the ink with a piezoelectric element, and a process in which bubbles are generated by heating the ink to utilize the pressure generated thereby, and all or a part of the ink droplets are adhered to a recording objective such as paper to perform the recording.

The ink, which is used for the ink-jet recording method as described above, includes those in which various water-soluble dyes or pigments are used as color materials, and they are dissolved or dispersed in a liquid medium composed of water or water and a water-soluble organic solvent. The dye and the pigment may be compared with each other as follows. That is, the dye is inferior in water resistance because of such a property that the dye is completely dissolved in the ink medium, and the dye is also inferior in light resistance to a considerable degree due to its chemical structure. On the other hand, the coloration of the pigment is not so vivid as compared with the dye, but the pigment is extremely excellent in weather resistance including water resistance, because the pigment is water-insoluble. Therefore, in recent years, the changeover is progressively effected for the ink for ink-jet printer from the ink containing the color material of the dye to the ink containing the color material of the pigment.

In the case of the ink composed the water-based medium containing the color material of the pigment, it is necessary that the pigment, which is insoluble in the water-based or aqueous medium, is finely dispersed in a stable manner for a long period. Those suggested as the method for dispersing the pigment in the water-based medium include a method described in U.S. Pat. No. 5,571,311 which uses a self-dispersing pigment applied with a surface treatment, for example, such that a hydrophilic group is introduced into the pigment surface, and a method in which a dispersing agent such as a surfactant and a polymer dispersing agent is added to a liquid medium.

The effect of the surface treatment is restricted by the chemical property of the pigment itself. Therefore, all of the pigments cannot be dispersed in the water-based medium in an effective manner. Therefore, the type of the pigment, which can be used as the self-dispersing pigment, is limited. Further, the color development of the pigment is inhibited, and neither sufficient optical concentration nor desired color is not obtained in some cases, because the pigment surface is chemically treated. The color ink, which contains the color material of the self-dispersing pigment, sometimes inferior in coloration as compared with the ink which contains the color material of the dye.

On the other hand, in the case of the ink in which the pigment is dispersed in the water-based liquid medium by using the dispersing agent, it is possible to obtain the ink having satisfactory coloration as compared with the ink based on the use of the self-dispersing pigment, because the pigment can be widely selected, and the pigment surface is not chemically treated.

Those usable as the dispersing agent include, for example, anionic surfactant, nonionic surfactant, cationic surfactant, and water-soluble polymer. Especially, a variety of anionic surfactants have great effects as the dispersing agent, with which the pigment is stably dispersed. However, in the case of the ink which uses the anionic surfactant as the dispersing agent, any excessive anionic surfactant, which does not principally contributes to the dispersion, considerably lowers the surface tension of the water-based liquid medium, and thus the permeating action of the ink into the paper is conspicuously facilitated. For this reason, when the ink droplets, which contain the anionic surfactant, are adhered to the recording paper, then the ink droplets quickly permeate into the paper, and they also permeate non-uniformly in the directions parallel to the paper surface. As a result, any blurring tends to occur, and it is impossible to obtain a sharp image. Further, for example, the following problem has also arisen. That is, the pigment scarcely stays on the paper surface, and the printing concentration becomes thin, because the ink excessively permeates into the paper. As for the blurring as described above, the whisker-like non-uniform blurring, which appears at portions subjected to the printing with a single color, is called "feathering". The non-uniform blurring, which is caused by the inks having different colors mixed with each other at adjoining portions, is called "bleeding".

Recently, in the offices, the combined information, which is composed of, for example, text letters and graphs, is recorded in many cases. When the ink-jet printer is used in such an office, it is especially demanded that the feathering and the bleeding scarcely occur, for example, on letters and ruled lines, and the printing concentration is high.

SUMMARY OF THE INVENTION

The present invention has been made in order to solve the problems as described above, an object of which is to provide an ink for ink-jet recording and a color ink set with which it is possible to obtain a sharp image having little feathering and little bleeding with a high printing concentration even when an anionic surfactant is used as a dispersing agent for a pigment. Another object of the present invention is to provide an ink-jet recording apparatus which accommodates the ink set of the present invention.

According to a first aspect of the present invention, there is provided an ink for ink-jet recording, comprising a pigment; an anionic surfactant; and a cationic surfactant. In the ink of the present invention, the anionic surfactant is principally used as a dispersing agent for the pigment. It is feared that some molecules of the anionic surfactant, which do not contribute to the dispersion of the pigment, i.e., free anionic surfactant molecules may cause the excessive permeation of the ink into the paper, and any feathering may be caused thereby. The cationic surfactant molecules are added for the free anionic surfactant molecules, and thus it is possible to suppress the excessive permeating action of the anionic surfactant. Accordingly, the content of the cationic surfactant in the ink is smaller than the content of the anionic surfactant, which is usually not more than ½ of the content of the anionic surfactant. In order to compensate the quantitative balance between the anionic surfactant and the cationic surfactant, the ink of the present invention may further comprise an amino acid having an amino group of positive polarity and a carboxyl group of negative polarity.

The ink of the present invention may further comprise a glycol ether as a permeating agent.

According to a second aspect of the present invention, there is provided a color ink set for ink-jet recording, comprising a first ink which contains a first pigment, a glycol ether, an anionic surfactant, and a cationic surfactant; and a second ink which contains a second pigment different from the first pigment, a glycol ether, an anionic surfactant, and a cationic surfactant. When the ink set is used, it is possible to effectively avoid the bleeding of the first ink and the second ink subjected to the printing. The ink set may further comprise third and fourth inks having mutually different colors.

According to a third aspect of the present invention, there is provided an ink-jet recording apparatus comprising an ink-jet head; an ink tank which accommodates an ink to be supplied to the ink-jet head; and an ink set of the present invention which is accommodated in the ink tank. The ink tank may be an ink container fixedly provided in the apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

The present invention will be explained in detail below. The ink for ink-jet recording of the present invention contains the pigment and the anionic surfactant. The pigment is not specifically limited, for which it is possible to use carbon black as well as many organic pigments and many inorganic pigments. The organic pigment is not specifically limited, which includes, for example, azo pigment such as azo lake, insoluble azo pigment, condensed azo pigment, and chelate azo pigment; polycyclic pigment such as phthalocyanine pigment, perylene and perynone pigments, anthraquinone pigment, quinacridone pigment, dioxazine pigment, thioindigo pigment, isoindolinone pigment, and quinophthalone pigment; dye lake such as basic dye type lake and acidic dye type lake; nitro pigment, nitroso pigment, and aniline black daylight fluorescent pigment. The inorganic pigment is not specifically limited, which includes, for example, titanium oxide and iron oxide-based pigment. Other pigments are also usable provided that they are dispersible in the aqueous phase. The blending amount of the pigment is preferably 0.5 to 10% by weight, and more preferably 0.5 to 8% by weight with respect to the total amount of the ink for ink-jet recording of the present invention.

The anionic surfactant is not specifically limited. However, for example, it is preferable to use polyoxyethylene alkyl ether sulfate salt and polyoxyalkyl ether phosphate salt as described in Japanese Patent Application Laid-open Nos. 2001-81372 and 11-12508. As for the blending amount of the anionic surfactant, the amount, with which the anionic surfactant appropriately functions as the dispersing agent, is suitably determined depending on the type of the pigment and the type of the anionic surfactant. However, usually, the blending amount of the anionic surfactant is preferably 5 to 40% by weight, and more preferably 10 to 30% by weight with respect to the blending amount of the pigment.

The ink for ink-jet recording of the present invention further contains the cationic surfactant. The cationic surfactant is not specifically limited, which includes, for example, quaternary ammonium salt, alkylamine, unsaturated carboxylic acid polyaminoamide, amine acetate, and ammonium chloride. The cationic surfactant may be used singly, or two or more of the cationic surfactants may be used in combination. It is preferable that the blending amount of the cationic surfactant is 0.01 to 3% by weight with respect to the total amount of the ink for ink-jet recording of the present invention. If the blending amount is less than 0.01% by weight, the excessive permeating action of the anionic surfactant cannot be counteracted sufficiently in some cases. If the blending amount exceeds 3% by weight, then the effect to stably disperse the pigment particles of the anionic surfactant is lost in some cases, or the feathering is inversely caused in other cases. More preferably, the blending amount of the cationic surfactant is 0.1 to 0.8% by weight.

It is preferable that the ink for ink-jet recording of the present invention further comprises the amino acid. In order to sufficiently obtain the effect of the present invention that the excessive permeating action into the paper is suppressed while stably dispersing the pigment particles, it is unfavorable that the blending amount of the cationic surfactant is either excessive or insufficient with respect to the anionic surfactant. Accordingly, in order to obtain a more appropriate balance between the both surfactants, the amino acid, which has the amino group of the positive polarity and the carboxyl group of the negative polarity, has been added to the ink for ink-jet recording of the present invention. As a result, the printing concentration has been further improved, and a sharp image, in which the feathering due to any non-uniform blurring is scarcely caused, has been successfully obtained, probably for the following reason. That is, it is considered that the anionic surfactant, the cationic surfactant, and the amino acid in the ink form the ion pairs, and thus the action of the excessive anionic surfactant or the excessive cationic surfactant can be suppressed. It is preferable for the amino acid to use glycine or L-alanine. If any amino acid, which has a molecular weight larger than those of glycine and L-alanine, is added, the added amino acid must be deposited to cause any clog-up of the nozzle in some cases, because of the low solubility in water. It is preferable that the blending amount of the amino acid is 0.1 to 3% by weight with respect to the total amount of the ink for ink-jet recording of the present invention. If the blending amount is less than 0.1% by weight, the effect to suppress the action of the excessive anionic surfactant or the excessive cationic surfactant is not sufficiently obtained in some cases. If the blending amount exceeds 3% by weight, the amino acid inversely inhibits the action of the anionic surfactant to contribute to the maintenance of the stable dispersion of the pigment or the cationic surfactant to contribute to the effect of the present invention.

It is preferable that the ink for ink-jet recording of the present invention further comprises the permeating agent. In the ink for ink-jet recording of the present invention, the permeating effect brought about by the anionic surfactant is counteracted by the action of the cationic surfactant. Therefore, the ink for ink-jet recording of the present invention is dried slightly slowly on the paper surface, which may cause any problem, for example, when the high speed printing is performed continuously for a plurality of sheets of recording paper. The permeating agent has such an effect that the drying time of the ink for ink-jet recording on the paper surface is shortened, and the occurrence of any non-uniform blurring is suppressed. Especially, when the color recording is performed by using the inks having a plurality of colors, the permeating agent also has an effect to suppress the bleeding.

Glycol ether is preferably used for the permeating agent. The glycol ether may include, for example, glycol-based n-butyl ether such as ethylene glycol-n-butyl ether, diethylene glycol-n-butyl ether, triethylene glycol-n-butyl ether, propylene glycol-n-butyl ether, dipropylene glycol-n-butyl ether, and tripropylene glycol-n-butyl ether; and glycol-based n-propyl ether such as ethylene glycol-n-propyl ether, diethylene glycol-n-propyl ether, triethylene glycol-n-propyl ether, propylene glycol-n-propyl ether, dipropylene glycol-n-propyl ether, and tripropylene glycol-n-propyl ether. The glycol ether may be used singly, or two or more of the glycol ethers may be used in combination.

It is preferable that the blending amount of the glycol ether is 1 to 20% by weight with respect to the total amount of the ink for ink-jet recording of the present invention. If the blending amount is less than 1% by weight, the effect to shorten the drying time on the paper surface is not obtained in some cases. If the blending amount exceeds 20% by weight, for example, the following harmful influences occur. That is, the viscosity of the ink becomes excessively high, and it is possible to effect any stable jetting operation. The ink consequently reaches the back surface of the paper due to the excessively large permeating action, resulting in the deterioration of printing quality in some cases. The blending amount of glycol ether is more preferably 1 to 10% by weight, and much more preferably 1 to 5% by weight.

The ink for ink-jet recording of the present invention may contain a moistening agent in order to avoid the clog-up of the nozzle which would be otherwise caused by evaporation and drying of water and adjust the viscosity of the ink. The moistening agent is not specifically limited. However, it is possible to preferably use, for example, divalent or polyvalent alcohols such as glycerol and 1,5-pentanediol; and glycols such as polyethylene glycol and diethylene glycol. It is preferable that the blending amount of the moistening agent is 2 to 50% by weight with respect to the total amount of the ink for ink-jet recording of the present invention. The blending amount of the moistening agent is preferably 2 to 50% by weight, more preferably 2 to 40% by weight, and much more preferably 15 to 35% by weight with respect to the total amount of the ink for ink-jet recording of the present invention.

Further, in order to improve the dispersibility of the pigment, the ink for ink-jet recording of the present invention may be optionally added with water-soluble polymer such as polyacrylic acid, polyvinyl pyrrolidone, and polyvinyl alcohol; and dispersing agents such as nonionic surfactants, in addition to the anionic surfactant and the cationic surfactant. Additionally, it is also allowable to add additives such as pH-adjusting agents, antiseptic agents, fungicides, and rust-preventive agents.

The following method is available to prepare the ink for ink-jet recording of the present invention. That is, at first, a pigment dispersion is prepared by using the anionic surfactant. After that, the ink is prepared by adding, for example, the cationic surfactant, the moistening agent, the permeating agent, the antiseptic agent, the rust-preventive agent, and water to adjust the pigment concentration to the pigment dispersion. The pigment dispersion is obtained by performing the dispersing treatment with a dispersing machine such as a three roll mill, a ball mill, a sand mill, and a homogenizer for the preparation obtained by adding, for example, the dispersing agent, the moistening agent, the pH-adjusting agent, and the antiseptic agent, if necessary, in addition to the pigment, the anionic surfactant, and water.

A color ink set including inks having a plurality of colors, in which all of the inks are the inks for ink-jet recording of the present invention, is also one embodiment of the present invention. Such a color ink set for ink-jet recording successfully gives the vivid color recording in which the printing concentration is high and the feathering and the bleeding are decreased.

As described above, the problems involved in the conventional technique are sufficiently solved in the ink for ink-jet recording of the present invention. Even when the anionic surfactant is used as the dispersing agent for the pigment, it is possible to give a sharp image in which the printing concentration is high and the feathering is decreased.

The present invention will be explained in further detail below as exemplified by examples. However, the present invention is not limited to only the examples.

Preparation of Pigment Dispersions

Pigment dispersions, which were used as materials for inks for ink-jet recording, were obtained by mixing the following respective materials, and then performing a dispersing treatment with a wet sand mill by using a medium composed of zirconia beads having a diameter of 0.3 mm.

Black Pigment Dispersion 1
  Pigment: Color Index No. Pigment Black 7: 20.0% by weight;
  Dispersing agent (anionic surfactant): polyoxyethylene lauryl ether ammonium sulfate (average polymerization degree of oxyethylene=12): 6.0% by weight;
  Moistening agent: diethylene glycol: 14.0% by weight;
  Pure water: 56.0% by weight;
  Antiseptic agent: Proxel GXL (produced by Avecia): 2.0% by weight;
  pH-adjusting agent: diethanolamine: 2.0% by weight.

Yellow Pigment Dispersion 2
  Pigment: Color Index No. Pigment Yellow 55: 17.5% by weight;
  Dispersing agent: polyoxyethylene oleyl ether ammonium sulfate (average polymerization degree of oxyethylene=18): 4.5% by weight;
  Moistening agent: glycerol: 16.0% by weight;
  Pure water: 58.0% by weight;
  Antiseptic agent: Proxel GXL (produced by Avecia): 2.0% by weight;
  pH-adjusting agent: ammonia: 2.0% by weight.

Magenta Pigment Dispersion 3
  Pigment: Color Index No. Pigment Red 122: 20.0% by weight;
  Dispersing agent: polyoxyethylene oleyl ether ammonium sulfate (average polymerization degree of oxyethylene=18): 4.0% by weight;
  Moistening agent: glycerol: 15.0% by weight;
  Pure water: 59.0% by weight;
  Antiseptic agent: Proxel GXL (produced by Avecia): 2.0% by weight.

Cyan Pigment Dispersion 4
  Pigment: Color Index No. Pigment Blue 153: 12.5% by weight;

Dispersing agent: polyoxyethylene lauryl ether ammonium sulfate (average polymerization degree of oxyethylene=5): 2.5% by weight;
Moistening agent: glycerol: 16.0% by weight;
Pure water: 67.0% by weight;
Antiseptic agent: Proxel GXL (produced by Avecia): 2.0% by weight;
pH-adjusting agent: monoethanolamine: 2.0% by weight.

EXAMPLE 1

Black Ink B1, Yellow Ink Y1, Magenta Ink M1, and Cyan Ink C1 were obtained by mixing and agitating the following respective materials and performing filtration with a membrane filter of 0.8 µm.

Black Ink B1
  Black pigment dispersion 1: 35.0% by weight;
  Polyethylene glycol (average molecular weight: 200): 2.0% by weight;
  Dipropylene glycol propyl ether: 5.0% by weight;
  Triethylene glycol dimethyl ether: 0.5% by weight;
  Tripropylene glycol monobutyl ether: 1.0% by weight;
  Glycine: 0.5% by weight;
  Cationic surfactant: (Disperbyk 130 produced by BYK Chemie): 0.3% by weight;
  Pure water: 55.7% by weight.
Yellow Ink Y1
  Yellow pigment dispersion 2: 40.0% by weight;
  Polyethylene glycol (average molecular weight: 200): 7.0% by weight;
  Dipropylene glycol propyl ether: 5.0% by weight;
  Tripropylene glycol monobutyl ether: 1.0% by weight;
  Glycine: 0.2% by weight;
  Cationic surfactant: (Disperbyk 130 produced by BYK Chemie): 0.3% by weight;
  Pure water: 46.5% by weight.
Magenta Ink M1
  Magenta pigment dispersion 3: 25.0% by weight;
  Glycerol: 16.0% by weight;
  Triethylene glycol monobutyl ether: 5.0% by weight;
  Glycine: 0.5% by weight;
  Cationic surfactant: (Disperbyk 130 produced by BYK Chemie): 0.5% by weight;
  Pure water: 53.0% by weight.
Cyan Ink C1
  Cyan pigment dispersion 4: 16.0% by weight;
  Glycerol: 22.0% by weight;
  Dipropylene glycol monopropyl ether: 5.0% by weight;
  Glycine: 0.2% by weight;
  Cationic surfactant: (Disperbyk 130 produced by BYK Chemie): 0.3% by weight;
  Pure water: 56.5% by weight.

EXAMPLE 2

Black Ink B2, Yellow Ink Y2, Magenta Ink M2, and Cyan Ink C2 were obtained by mixing and agitating the following respective materials and performing filtration with a membrane filter of 0.8 µm.

Black Ink B2
  Black pigment dispersion 1: 35.0% by weight;
  Polyethylene glycol (average molecular weight: 200): 2.0% by weight;
  Dipropylene glycol propyl ether: 5.0% by weight;
  Triethylene glycol dimethyl ether: 0.5% by weight;
  Tripropylene glycol monobutyl ether: 1.0% by weight;
  Cationic surfactant: (Disperbyk 130 produced by BYK Chemie): 0.3% by weight;
  Pure water: 56.2% by weight.
Yellow Ink Y2
  Yellow pigment dispersion 2: 40.0% by weight;
  Polyethylene glycol (average molecular weight: 200): 7.0% by weight;
  Dipropylene glycol propyl ether: 5.0% by weight;
  Tripropylene glycol monobutyl ether: 1.0% by weight;
  Cationic surfactant: (Disperbyk 130 produced by BYK Chemie): 0.3% by weight;
  Pure water: 46.7% by weight.
Magenta Ink M2
  Magenta pigment dispersion 3: 25.0% by weight;
  Glycerol: 16.0% by weight;
  Triethylene glycol monobutyl ether: 5.0% by weight;
  Cationic surfactant: (Disperbyk 130 produced by BYK Chemie): 0.5% by weight;
  Pure water: 53.5% by weight.
Cyan Ink C2
  Cyan pigment dispersion 4: 16.0% by weight;
  Glycerol: 22.0% by weight;
  Dipropylene glycol monopropyl ether: 5.0% by weight;
  Cationic surfactant: (Disperbyk 130 produced by BYK Chemie): 0.3% by weight;
  Pure water: 56.7% by weight.

Comparative Example 1

Black Ink B3, Yellow Ink Y3, Magenta Ink M3, and Cyan Ink C3 were obtained by mixing and agitating the following respective materials and performing filtration with a membrane filter of 0.8 µm.

Black Ink B3
  Black pigment dispersion 1: 35.0% by weight;
  Polyethylene glycol (average molecular weight: 200): 12.0% by weight;
  Pure water: 53.0% by weight.
Yellow Ink Y3
  Yellow pigment dispersion 2: 40.0% by weight;
  Polyethylene glycol (average molecular weight: 200): 9.5% by weight;
  Pure water: 50.5% by weight.
Magenta Ink M3
  Magenta pigment dispersion 3: 25.0% by weight;
  Glycerol: 21.0% by weight;
  Pure water: 54.0% by weight.
Cyan Ink C3
  Cyan pigment dispersion 4: 16.0% by weight;
  Glycerol: 27.0% by weight;
  Pure water: 57.0% by weight.

Comparative Example 2

Black Ink B4, Yellow Ink Y4, Magenta Ink M4, and Cyan Ink C4 were obtained by mixing and agitating the following respective materials and performing filtration with a membrane filter of 0.8 µm.

Black Ink B4
  Black pigment dispersion 1: 35.0% by weight;
  Polyethylene glycol (average molecular weight: 200): 2.0% by weight;

Dipropylene glycol propyl ether: 5.0% by weight;
Triethylene glycol dimethyl ether: 0.5% by weight;
Tripropylene glycol monobutyl ether: 1.0% by weight;
Pure water: 56.5% by weight.

Yellow Ink Y4
  Yellow pigment dispersion 2: 40.0% by weight;
  Polyethylene glycol (average molecular weight: 200): 7.0% by weight;
  Dipropylene glycol propyl ether: 5.0% by weight;
  Tripropylene glycol monobutyl ether: 1.0% by weight;
  Pure water: 47.0% by weight.

Magenta Ink M4
  Magenta pigment dispersion 3: 25.0% by weight;
  Glycerol: 16.0% by weight;
  Triethylene glycol monobutyl ether: 5.0% by weight;
  Pure water: 54.0% by weight.

Cyan Ink C4
  Cyan pigment dispersion 4: 16.0% by weight;
  Glycerol: 22.0% by weight;
  Dipropylene glycol monopropyl ether: 5.0% by weight;
  Pure water: 57.0% by weight.

EXAMPLE 3

Black Ink B5 was obtained by mixing and agitating the following respective materials and performing filtration with a membrane filter of 0.8 μm.

Black Ink B5
  Black pigment dispersion 1: 35.0% by weight;
  Polyethylene glycol (average molecular weight: 200): 8.5% by weight;
  Cationic surfactant (Disperbyk 130 produced by BYK Chemie): 0.3% by weight;
  Pure water: 56.2% by weight.

EXAMPLE 4

Black Ink B6 was obtained by mixing and agitating the following respective materials and performing filtration with a membrane filter of 0.8 μm.

Black Ink B6
  Black pigment dispersion 1: 35.0% by weight;
  Glycerol: 10.0% by weight;
  Cationic surfactant (Acetamin 24 produced by Kao Corporation): 0.1% by weight;
  Pure water: 54.9% by weight.

EXAMPLE 5

Cyan Ink C5 was obtained by mixing and agitating the following respective materials and performing filtration with a membrane filter of 0.8 μm.

Cyan Ink C5
  Cyan pigment dispersion 4: 16.0% by weight;
  Glycerol: 27.0% by weight;
  Cationic surfactant (Quartamin 24P produced by Kao Corporation): 2.0% by weight;
  Pure water: 55.0% by weight.

Letters or characters and ruled lines were printed with single colors respectively with the respective inks prepared in Examples 1 to 5 and Comparative Examples 1 and 2 by using a printing apparatus of a multifunctional ink-jet printer (MFC-7400J produced by Brother Industries, Ltd.) and using a recording objective of regular paper (BUSINESS MULTIPURPOSE 4200 PAPER produced by Xerox) to evaluate the feathering and the printing concentration in accordance with the following criterion. Further, the color recording was performed with four-color inks for ink-jet recording of black, yellow, magenta, and cyan prepared in Examples 1 and 2 and Comparative Examples 1 and 2 to evaluate the bleeding at portions at which different colors adjoined, in accordance with the following criterion.

Evaluation Criterion for Feathering
  ++: non-uniform blurring is scarcely recognizable; +: printed matter is practically usable, although non-uniform blurring is slightly recognizable; ±: non-uniform blurring is recognizable, and printed matter involves practical problem; −: non-uniform blurring is clearly recognizable, and printed matter is not practically usable.

Evaluation Criterion for Printing Concentration
  ++: printed matter has sufficient printing concentration; +: printed matter has printing concentration of such degree that no problem practically occurs; +: printing concentration is slightly low, and printed matter involves practical problem; −: printing concentration is clearly low, and printed matter is not practically usable.

Evaluation Criterion for Bleeding
  ++: non-uniform blurring is scarcely recognizable; +: printed matter is practically usable, although non-uniform blurring is slightly recognizable; +: non-uniform blurring is recognizable, and printed matter involves practical problem; −: non-uniform blurring is clearly recognizable, and printed matter is not practically usable.

Results of Examples 1 and 2 and Comparative Examples 1 and 2 are shown in Table 1. Results of Examples 3, 4, and 5 are shown in Table 2.

TABLE 1

| | Ink | Feathering | Printing concentration | Bleeding |
|---|---|---|---|---|
| Example 1 | Black B1 | ++ | ++ | ++ |
| | Yellow Y1 | ++ | ++ | |
| | Magenta M1 | ++ | ++ | |
| | Cyan C1 | ++ | ++ | |
| Example 2 | Black B2 | + | + | ++ |
| | Yellow Y2 | ++ | ++ | |
| | Magenta M2 | + | + | |
| | Cyan C2 | + | + | |
| Comparative Example 1 | Black B3 | − | ± | − |
| | Yellow Y3 | ± | ± | |
| | Magenta M3 | − | − | |
| | Cyan C3 | − | − | |
| Comparative Example 2 | Black B4 | − | − | + |
| | Yellow Y4 | ± | ± | |
| | Magenta M4 | − | − | |
| | Cyan C4 | − | − | |

TABLE 2

| | Ink | Feathering | Printing concentration |
|---|---|---|---|
| Example 3 | Black B5 | + | + |
| Example 4 | Black B6 | + | + |
| Example 5 | Cyan C5 | + | + |

As shown in Table 1, the recorded matter, which was subjected to the recording with the single color by using each of the inks for ink-jet recording prepared in Example 1, had an extremely excellent quality in which the printing concentration was high and the feathering was scarcely caused. The recorded matter, which was subjected to the color recording by using the color ink set for ink-jet recording prepared in Example 1, had an extremely excellent quality in which the bleeding was scarcely caused. Even when another recording medium was superimposed on the recorded matter immediately after the printing subjected to the recording with each of the inks for ink-jet recording prepared in Example 1, the paper surface of the recorded matter was not soiled.

The recorded matter, which was subjected to the recording with the single color by using each of the inks for ink-jet recording prepared in Example 2, had a practically sufficient quality in which the printing concentration and the feathering performance were slightly inferior to the recorded matter subjected to the recording by using each of the inks for ink-jet recording prepared in Example 1, probably for the following reason. That is, it is considered that the excessive permeating effect brought about by the anionic or cationic surfactant is suppressed in each of the inks of Example 1 as compared with each of the inks of Example 2, because each of the inks of Example 1 contains glycine as the amino acid. The recorded matter, which was subjected to the color recording by using the color ink set for ink-jet recording prepared in Example 2, had an extremely excellent quality in which the bleeding was scarcely caused. Even when another recording medium was superimposed on the recorded matter immediately after the printing subjected to the recording with each of the inks for ink-jet recording prepared in Example 2, the paper surface of the recorded matter was not soiled.

The recorded matter, which was subjected to the recording with the single color by using each of the inks for ink-jet recording prepared in Comparative Example 1, had a serious problem in printing quality in which the printing concentration was insufficient and the feathering was intensely caused. The recorded matter, which was subjected to the color recording by using the color ink set for ink-jet recording prepared in Comparative Example 1, had a serious problem in printing quality in which the bleeding was intensely caused. When another recording medium was superimposed on the recorded matter immediately after the printing subjected to the recording with each of the inks for ink-jet recording prepared in Comparative Example 1, the paper surface of the recorded matter was soiled. Therefore, a problem arose in the drying property of the ink for ink-jet recording on the paper surface.

The recorded matter, which was subjected to the recording with the single color by using each of the inks for ink-jet recording prepared in Comparative Example 2, was never satisfactory in the feathering and the printing concentration, involving a problem in printing quality. The recorded matter, which was subjected to the color recording by using the color ink set for ink-jet recording prepared in Comparative Example 2, had a had a relatively good result in the bleeding.

As shown in Table 2, the recorded matter, which was subjected to the recording with the single color by using each of the inks for ink-jet recording prepared in Examples 3, 4, and 5, had a practically sufficient quality in which the printing concentration was high and the feathering was scarcely caused.

The present invention is constructed as described above. Therefore, even when the anionic surfactant is used as the dispersing agent for the pigment, then it is possible to obtain a sharp image in which the printing concentration is high and the feathering and the bleeding are scarcely caused, and it is possible to provide the ink for ink-jet recording in which no problem arises even in the case of the high speed printing.

An embodiment of an ink jet printer as an ink-jet recording apparatus in accordance with the invention will be described as below with reference to the accompanying drawings.

Figure 1:
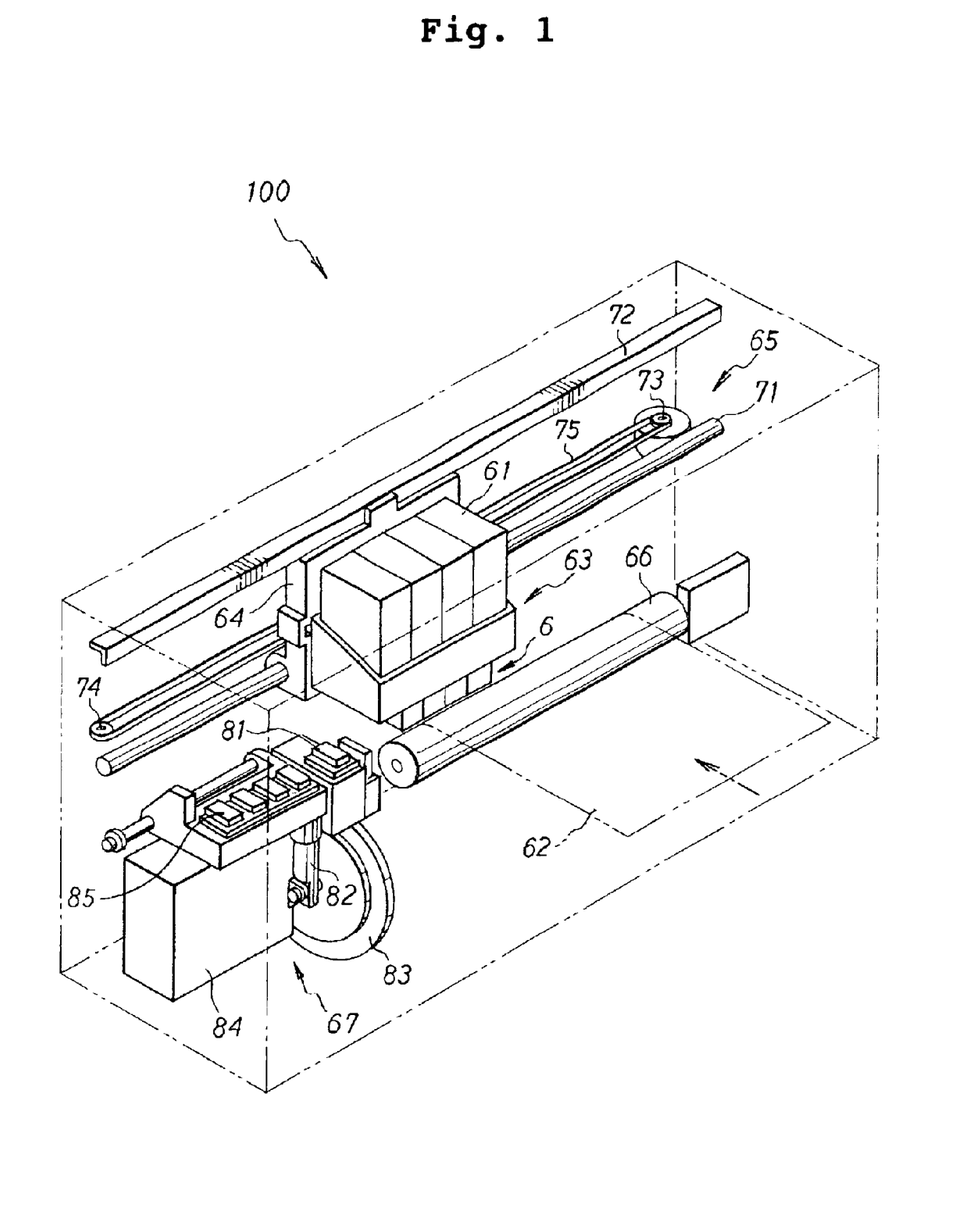
FIG. 1 is a perspective view showing a color ink-jet printer having an ink cartridge which contains color ink prepared in examples of the invention.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples may be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
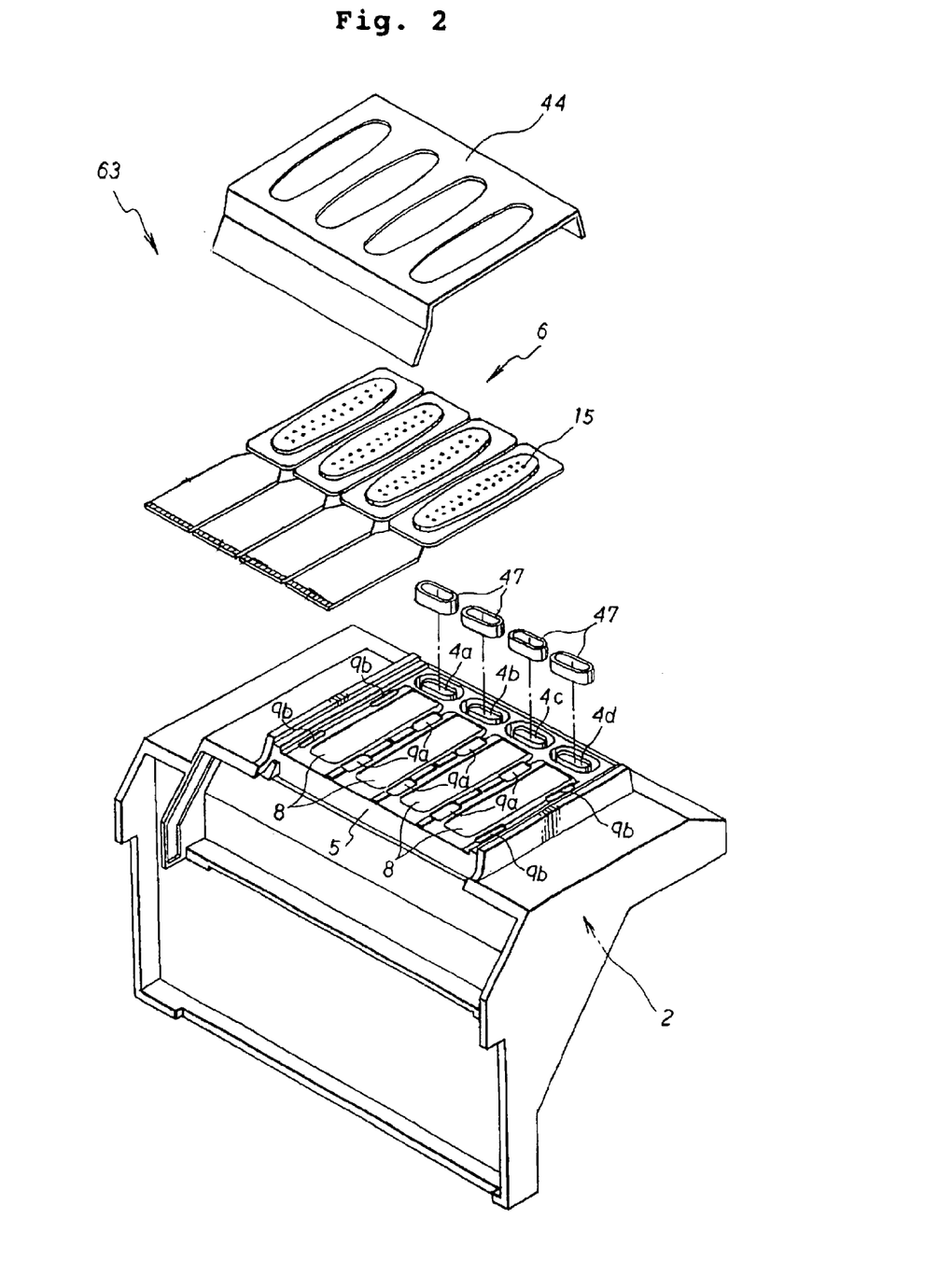
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a as shown in FIG. 3.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
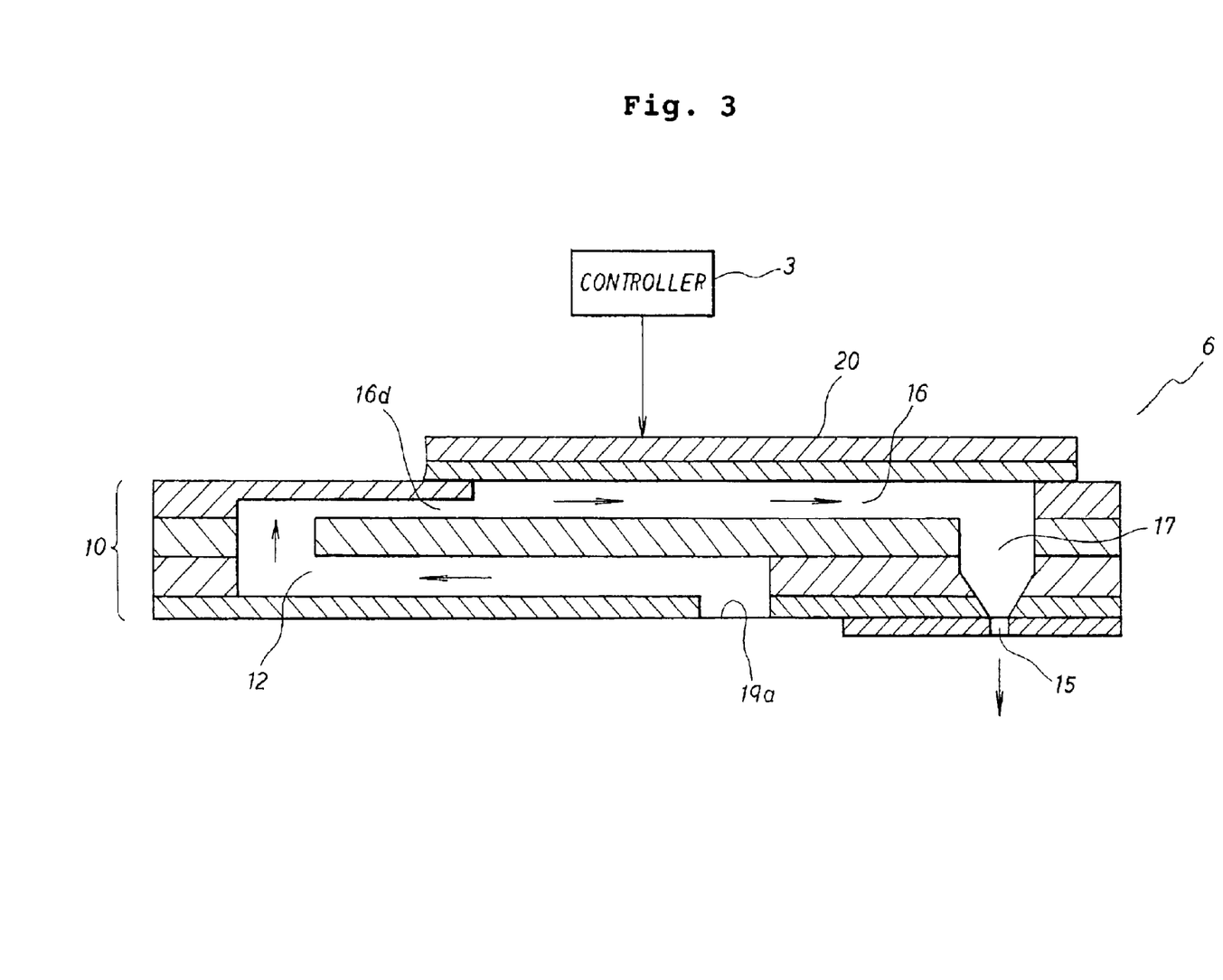
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

The present invention is constructed as described above. Therefore, it is possible to provide the ink set for ink-jet recording capable of performing vivid color recording in which the color bleed is reduced at the adjoining portions of the black ink and the color ink without causing, for example, any deposition of the dye in the color ink. When the ink and the ink set of the present invention are used, it is also possible to suppress the corrosion at the metal portion of the ink-jet recording apparatus.

What is claimed is:

1. An ink for ink-jet recording, comprising:
   a pigment;
   an anionic surfactant; and
   a cationic surfactant,
   wherein the content of the cationic surfactant is smaller than the content of the anionic surfactant.

2. The ink according to claim 1, further comprising an amino acid.

3. The ink according to claim 1, further comprising a glycol ether.

4. The ink according to claim 1, wherein the cationic surfactant is contained in the ink by 0.01 to 3% by weight.

5. A color ink set for ink-jet recording, comprising:
   a first ink which contains a first pigment, a glycol ether, an anionic surfactant, and a cationic surfactant; and
   an second ink which contains a second pigment different than the first pigment, a glycol ether, an anionic surfactant, and a cationic surfactant,
   wherein the content of the cationic surfactant is smaller than the content of the anionic surfactant.

6. The ink set according to claim 5, wherein each of the first ink and the second ink contains an amino acid.

7. The ink-jet recording apparatus comprising:
   an ink-jet head;
   an ink tank which accommodates an ink to be supplied to the ink-jet head; and
   an ink set as defined in claim 5 which is accommodated in the ink tank.

8. The ink-jet recording apparatus according to claim 7, wherein the ink set is a ink cartridge which includes first and second compartments for accommodating at least the first ink and the second ink respectively.

9. The ink-jet recording apparatus according to claim 7, wherein the ink tank is a replaceable ink cartridge.

10. The ink according to claim 1, wherein the anionic surfactant is contained in the ink by 5 to 40% by weight.

* * * * *